United States Patent [19]
Katris

[11] 3,866,527
[45] Feb. 18, 1975

[54] ROTISSERIE
[76] Inventor: Thomas C. Katris, 8225 Kraay St., Munster, Ind. 46321
[22] Filed: Apr. 25, 1973
[21] Appl. No.: 354,353

[52] U.S. Cl. .................... 99/421 H, 99/339, 99/448
[51] Int. Cl. ............................................. A47j 37/04
[58] Field of Search ............ 99/421, 339, 340, 409, 99/419, 420, 448; 259/1 A, 104

[56] References Cited
UNITED STATES PATENTS

| | | | |
|---|---|---|---|
| 2,125,965 | 8/1938 | Sturm | 99/421 HH X |
| 2,494,448 | 1/1950 | Nassif | 99/421 HH |
| 3,017,819 | 1/1962 | Manteris | 99/421 HH |
| 3,019,720 | 2/1962 | Topper | 99/339 |
| 3,169,470 | 2/1965 | Oatley | 99/421 HH |
| 3,194,149 | 7/1965 | Shibley | 99/421 HH |
| 3,309,982 | 3/1967 | Surks | 99/420 |

Primary Examiner—Robert W. Jenkins
Assistant Examiner—Arthur O. Henderson
Attorney, Agent, or Firm—D. Paul Weaver

[57] ABSTRACT

This specification discloses a rotisserie intended for mounting on a standard broiler and which comprises a rectangular frame presenting side members of hollow construction. Received in each side member is a drive screw which is driven by a motor on one end of the frame. Each side member has an inner vertical wall which is formed with a plurality of large circular openings uniformly spaced apart. Each side member also has an outer vertical wall formed with uniformly spaced small openings in axial alignment with the openings in the inner wall. A driving cup is journalled in each pair of aligned openings. Each cup is formed with an external worm gear that meshes with a drive screw. Each cup opens onto the outer face of the inner wall and presents a non-circular recess. A sleeve for each cup is swingably mounted on a bracket secured to said inner wall above an opening therein. A spit drive shaft passes through this sleeve and its inner end carries a member corresponding in shape to the cup recess in which it is received. A spring clamp is mounted on the inner end of each spit drive shaft and detachably receives the head of a split.

A supporting rod extends longitudinally of the frame midway the side members and is notched to supportingly receive the ends of spits when the latter are in horizontal positions. The spit carrying portions of the frame is of a standard size having a number of spits. The drive screws project beyond one end of the frame where they are adapted to be connected to another frame having an additional number of spits.

9 Claims, 5 Drawing Figures

PATENTED FEB 18 1975

ROTISSERIE

The present invention relates to rotisseries and is concerned primarily with a novel drive to the spits which provides for the detachable connections of the spits to the drive and for swinging each spit into a position of non-use.

BACKGROUND OF THE INVENTION

At the present time it is known to provide a rotisserie with a central drive shaft to which a plurality of spits are drivably connected and detachable therefrom. Each spit is intended to receive an individual food portion which is rotated over a broiler. These known rotisseries have certain features which are considered as undesirable and which place limitations on the use of the rotisserie.

Among these defects is the fact that the ends of the spits remote from the drive shaft are unsupported. Thus, the size or weight of a food portion which may be carried by a spit is restricted. Then, while the spits are detachable there is no arrangement or mechanism which provides for swinging a spit into an out of the way position of non-use such as a vertical position with the spits remaining assembled with a portion of the drive mechanism. Also, there is no rotisserie available which contains an assembly of what might be called a standard number of spits and which is adapted to be operatively connected to another unit containing a number of spits.

With the foregoing conditions in mind, the present invention has in view the following objectives:

1. To provide a rotisserie which includes a drive providing individual driving elements for a plurality of spits with each such element being swingable into an out of the way position while a spit is connected thereto.

2. To provide, in a rotisserie of the type noted, means for supporting the ends of the spits remote from their connection to a drive while food on the spits is being cooked.

3. To provide, in a rotisserie of the character aforesaid, a unit comprising a standard number of spits and a drive therefor, and which unit is adapted to be operatively connected to another unit having a plurality of spits.

4. To provide, in a rotisserie of the kind described, a rectangular frame presenting hollow side members, each of which includes inner and outer vertical walls having pairs of aligned openings therein with a driving cup journalled in each pair and having a worm gear meshing with a drive screw in the respective side member.

5. To provide, in a rotisserie of the type noted, a sleeve associated with each drive cup which is swingably mounted on a side member and which slidingly receives a spit drive shaft, one end of which is drivably received in the cup and the other end of which carries a spring clamp for detachably receiving the head of a spit; and 6. To provide, in a rotisserie of the character aforesaid, a frame having side members with a drive screw in each side member and projecting therefrom for connecting to the drive screw in another frame.

Various other more detailed objects and advantages of the invention, such as arise in connection with carrying out the above ideas in a practical embodiment, will, in part, become apparent and, in part, be hereafter stated as the description of the invention proceeds.

SUMMARY OF THE INVENTION

The foregoing objects are achieved by providing a rotisserie that is intended for placement over a standard broiler and which includes a rectangular frame presenting a pair of parallel hollow side members, each having inner and outer vertical walls. A drive screw is rotatably mounted in each side member and is driven by a motor on one end of the frame. The inner wall of each side member is formed with a plurality of uniformly spaced large openings while the outer wall of that side member is formed with a series of uniformly spaced small openings. Each of the latter is in axial alignment with a large opening in the inner wall.

A driving cup comprising a flat bottom and a cylindrical wall is journalled in each pair of aligned openings with the cylindrical wall being rotatably received in the large opening and a stub shaft projecting axially from the bottom being received in the small opening. The cylindrical wall is provided externally with a worm gear which meshes with a drive screw. Each drive cup defines a non-circular recess.

A bracket is mounted on the inner wall above each large opening therein. Pivotally mounted on this bracket is a sleeve which slidably receives a spit drive shaft. One end of this drive shaft is slidably received in the cup recess and has a configuration corresponding to that of the recess whereby the driving relation between the cup and drive shaft is established. A spring clamp is mounted on the other end of each spit drive shaft and detachably receives the end of a spit.

A rod is mounted in the frame and extends longitudinally thereof midway the side members. This rod is notched to supportingly engage the ends of spits when the latter are in horizontal positions.

Each screw projects beyond one end of the side member in which it is mounted whereby it may be operatively connected to the drive screw of another unit having a plurality of spits.

For a full and more complete understanding of the invention, reference may be had to the following description and the accompanying drawings wherein.

DESCRIPTION OF THE PREFERRED EMBODIMENT

Figure 4:
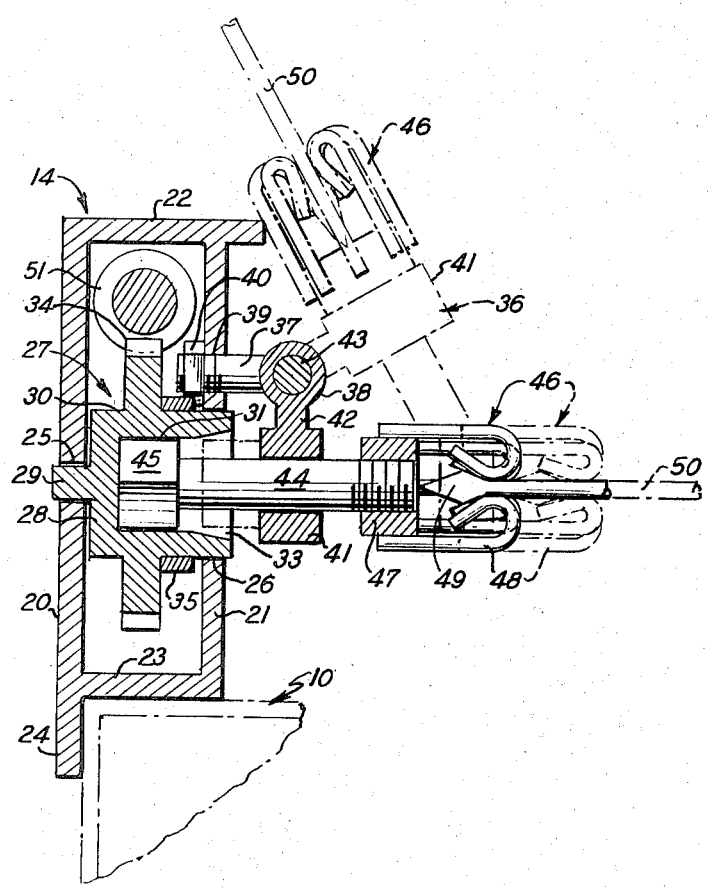
FIG. 4 is a transverse vertical sectional view being taken on line 4—4 of FIG. 1 but showing the driving cup in section.

Referring now to the drawings, wherein like reference characters denote corresponding elements throughout the several views, and, first, more particularly to FIG. 4, a portion of a conventional broiler is shown in broken lines at 10. The broiler itself is no part of the present invention but it is deemed advisable to note that broilers are more or less standardized as being of rectangular shape. They often are of a longitudinal extent sufficient to support one or more rotisserie units in addition to that now to be described.

Figure 1:
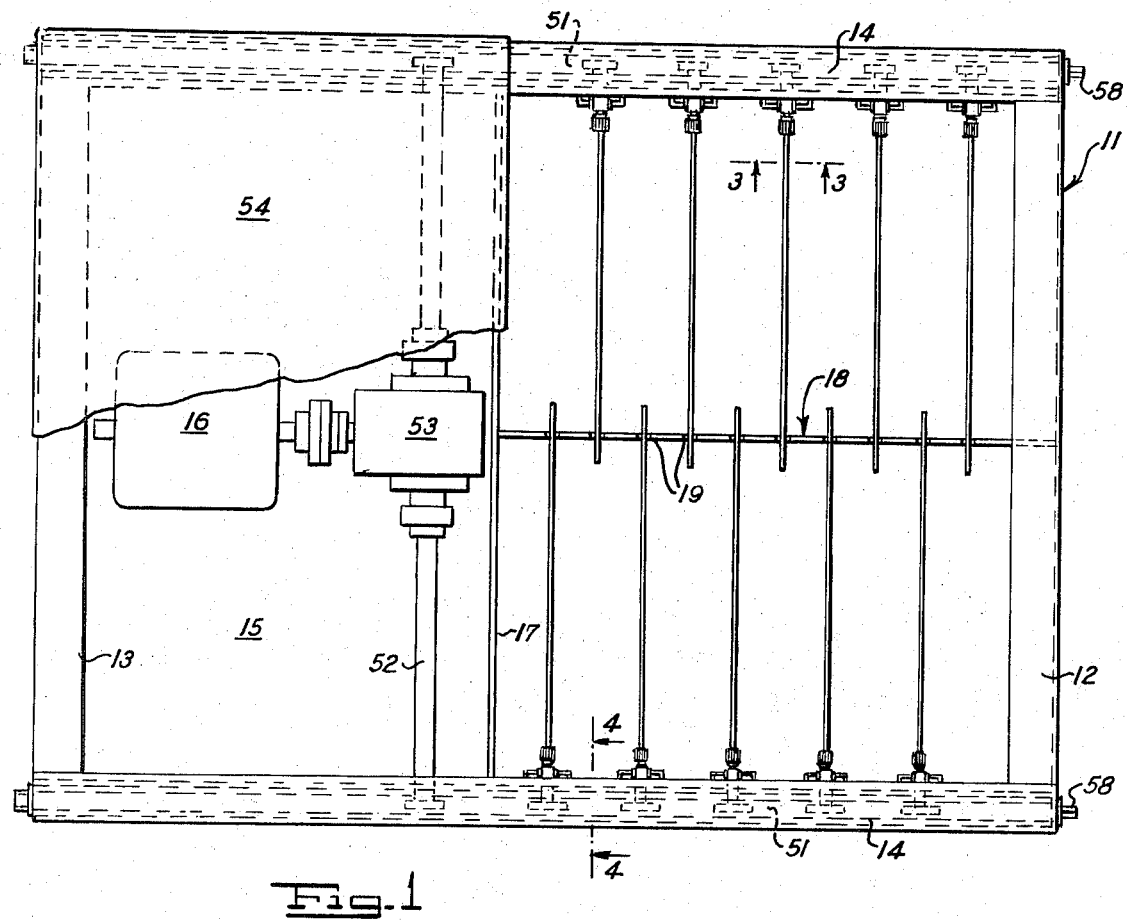
FIG. 1 is a top plan view of a rotisserie embodying the precepts of this invention with the cover for a motor broken away.

Referring now to FIG. 1, a rectangular frame is identified in its entirety by the reference character 11. It comprises end members 12 and 13 and side members 14 which are mirror duplicates. While the construction of a side member 14 will later be described in detail, it is noted at this point that a platform 15 is mounted between members 14 at the end adjacent to member 13. An electric motor 16 is supported by platform 15. A cross strut 17 extends between side members 14 and a longitudinal medial support rod 18 has one end secured to strut 17 and its other end to end member 12. The upper edge of rod 18 is formed with notches 19 for a purpose to be later described.

Figure 2:
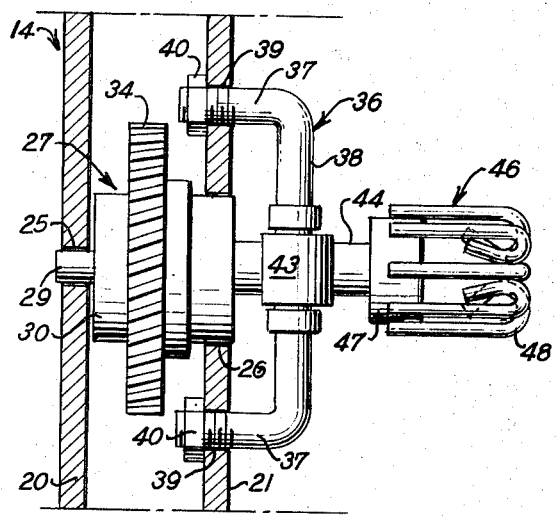
FIG. 2 is a detailed horizontal section on an enlarged scale through one side member.
Figure 3:
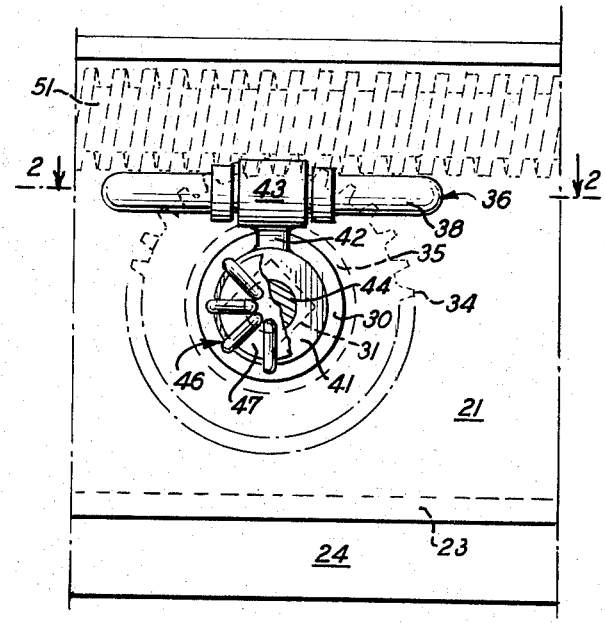
FIG. 3 is a detailed longitudinal vertical section taken on an enlarged scale through a side member, being taken on the plane of the line 3—3 of FIG. 1.

Referring now to FIGS. 2 and 4, a side member is of hollow construction defined by outer side wall 20, inner side wall 21, top wall 22 and bottom wall 23. Outer wall 20 is continued below bottom wall 23 to provide a flange 24 which engages a side face of broiler 10 and positions frame 11 on broiler 10.

Outer wall 20 is formed with a series of uniformly spaced small openings 25 between strut 17 and end member 12. Inner wall 21 is also formed with a plurality of uniformly spaced large openings 26 in the same area. Each opening 25 is in axial alignment with an opening 26 whereby the two constitute a pair of openings in which a driving cup designated generally 27 is journalled.

Cup 27 has a bottom 28 from which axially projects a stub shaft 29 that is rotatable in opening 25. Joined to the periphery of bottom 28 is a cylindrical wall 30 that is rotatable in opening 26. Cylindrical wall 30 defines a recess 31 which is non-circular, with a square being the preferred shape. Recess 31 is flared at its outer end for a purpose to be later described as shown at 33.

A worm gear 34 is carried by cylindrical wall 30 and may be formed integrally therewith as shown in FIG. 4. A spacer ring 35 is interposed between gear 34 and inner wall 21.

A U-shaped bracket is designated generally 36. It comprises legs 37 and a back 38. On a plane above opening 26, inner wall 21 is formed with a pair of apertures 39, one on each side of opening 26. The ends of legs 37 are threaded and pass through openings 39, whereupon nuts 40 are secured thereonto to secure bracket 36 in position on wall 21 with back 38 spaced outwardly of wall 21 and above the axis of opening 26. A sleeve 41 has a hanger 42 projecting from the upper portion thereof and which carries a bearing 43 at its upper end in which is journalled back 38 of bracket 36. Thus, a sleeve 41 is swingably mounted on wall 21 in spaced relation relative thereto.

A spit drive shaft 44 is slidable in sleeve 41. It is formed with a head 45 of the same non-circular shape as recess 31 in which it is slidably received. The outer end of spit drive shaft 44 is threaded and screwed thereonto, is a spring clamp identified generally at 46. It comprises a nut 47 to which are secured, as by welding, the legs of a plurality of springs 48 having inturned loops which grippingly engage the head 49 of a spit 50.

A drive screw 51 is mounted for rotation in each side member 14 above worm gears 34 with which it meshes. Each drive screw 51 is operatively connected to motor 16 to be driven thereby. Such driving connections are well known and details thereof are, therefore, not herein illustrated nor described. These driving connections are depicted diagrammatically at 52 and 53. A cover 54 extends over the area defined by end member 13, side members 14 and strut 17. It protects motor 16 and the driving connections therefrom to drive screws 51.

Figure 5:
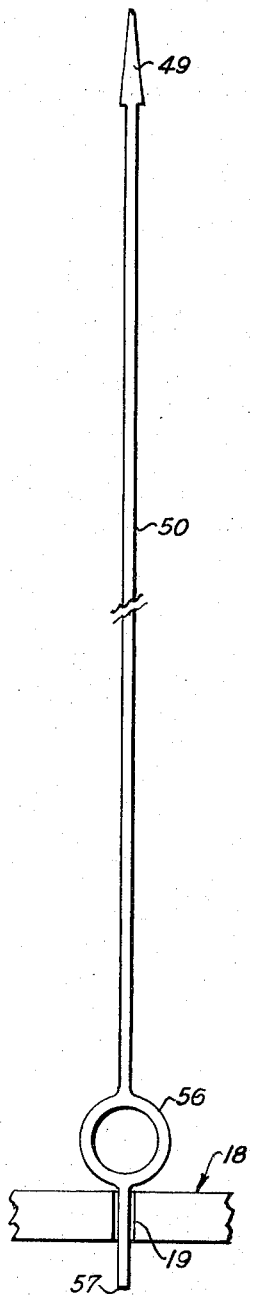
FIG. 5 is a detailed elevation of a spit per se, as broken away to permit of illustration on a desired scale.

While spits of different types may be used in the subject broiler, FIG. 5 depicts a preferred form of spit. This spit 50 has a head 49 which is engaged by a spring clamp 46 to drivably mount the spit on a drive shaft 44. Spaced from the other end is a handle in the form of a loop 56 leaving an end portion 57 that is received in a notch 19.

OPERATION

While the manner in which the subject rotisserie is used is believed to be obvious from the illustrations of the drawings and description of parts set forth above, it is briefly outlined as follows:

Let us first assume that all of the sleeves 41 are in the full line position of FIG. 4 and a spit drive shaft 44 is received in each sleeve 41 with its square head 45 received in square recess 31. Also, each spit 50 is carrying a food portion and its head 49 is clampingly engaged by a spring clamp 46. With motor 16 energized, power is transmitted through driving connections 52 and 53 to rotate drive screws 51. The latter slowly rotate worm gears 34 which cause drive cups 27 to rotate. This results in rotation of spits 50. During the cooking period, end portions 57 of spit 50 are received in notches 19 whereby they are supported by rod 18.

Should it be desired to swing a spit 50 into an out of the way substantially vertical position, and at the same time retain the connection of the spit to its drive shaft 44, the latter is slid inwardly, that is, toward rod 18, until head 45 clears the flared end 33 of the driving cup. Hanger 42, to which sleeve 41 is connected, is then swung on its bearing 43 about back 38 of bracket 36 into the broken line position of FIG. 4. This position is slightly past the vertical.

Food may be removed from the spit while it is still so connected or the spit may be detached from clamp 46 and the food then removed. With food to be cooked on a spit, sleeve 41 is swung inwardly into a position in which it is coaxial with openings 25 and 26. Shaft 44 is then slid outwardly, that is, away from rod 18 so that its head 45 enters recess 31 in which it is seated. Flared end portion 33 facilitates this insertion.

If a rotisserie of the size illustrated does not have the capacity for a particular cooking operation, as determined by the number of spits 50, and broiler 10 is of sufficient longitudinal extent to accommodate another spit containing unit, the latter may be placed on broiler 10 and the drive screws 51 thereof connected to the projecting ends of drive screws 51 of the unit in place on the broiler as shown at 58.

While a preferred specific embodiment is herein disclosed, it is to be clearly understood that the invention is not to be limited to the exact construction, mechanisms or devices illustrated and described because various modifications of these details may be provided in putting the invention into practice.

What is claimed is:

1. A rotisserie structure mountable upon a conventional broiler and adapted to span the broiler from side-to-side thereof and comprising a pair of hollow frame sides arranged in parallel laterally spaced relation and adapted to rest on opposite sides of a broiler and to extend longitudinally of such broiler sides, each hollow frame side having an interior and exterior vertical wall and said walls provided at regular intervals along the frame side with aligned pairs of openings formed therethrough, a driving screw shaft journaled for rotation in the upper portion of each hollow frame side above said pairs of openings at right angles to the axes of the openings, power drive means coupled with said screw shafts to turn them in unison on their axes, drive cups mounted on each hollow frame side and having end portions journaled for rotation in said aligned pairs of openings of the frame sides, said cups having driving socket recesses opening through their interior ends and facing toward the remote hollow frame side of the structure, gears on the drive cups and meshing with said screw shafts within the hollow frame sides whereby said cups are turned in unison, spit driving shafts detachably coupled with said driving socket recesses of the cups, spits coupled with said spit driving shafts and extending axially inwardly thereof transversely of said hollow frame sides and having inner ends terminating substantially midway between the frame sides and near the lateral center of the broiler on which said structure is mountable, support means for the inner ends of the spits near the lateral center of the rotisserie structure, and a pivotal support element for each spit driving shaft secured to the adjacent hollow frame side of the structure and slidably receiving the spit driving shaft and being swingable therewith in a vertical plane to an elevated non-use position with the associated spit, said spit driving shaft then separating from said driving socket recess of its associated cup.

2. A rotisserie structure as defined in claim 1, wherein said aligned pairs of openings of one hollow frame side are staggered in relation to the openings of the opposite frame side, whereby the spits of the rotisserie structure are correspondingly staggered.

3. A rotisserie structure as defined in claim 1, and said support means for the inner ends of the spits comprising a frame rod parallel to the hollow frame sides and being notched in its top to receive inner end portions of the spits to support and stabilize the spits during their rotation with said drive cups.

4. A rotisserie structure as defined in claim 1, and a spring coupling means for each spit carried by the interior end of each spit driving shaft whereby each spit is readily separable from its driving shaft.

5. A rotisserie structure as defined in claim 1, and each pivotal support element comprising a sleeve within which the associated spit driving shaft is axially and rotatably movable, and a fixed overhead hinge support for each sleeve on the interior wall of the associated hollow frame side of the structure.

6. A rotisserie structure as defined in claim 1, and the driving socket of each drive cup consisting of a polygonal socket opening, and a mating polygonal drive head on each spit driving shaft adapted to enter the polygonal socket opening.

7. A rotisserie structure as defined in claim 1, and each aligned pair of openings comprising a relatively small opening in the exterior wall of said hollow frame side and a larger opening in the interior wall thereof, each drive cup having a cylindrical body portion journaled in the larger opening and having a small stub shaft on its outer end journaled in the relatively small opening.

8. A rotisserie structure as defined in claim 1, and said driving screw shafts having end coupling portions projecting beyond corresponding ends of the hollow frame sides to facilitate coupling together plural units of the rotisserie structure on a long supporting broiler.

9. A rotisserie structure as defined in claim 1, and said power drive means coupled with said screw shafts comprising a drive motor, a pair of transverse drive shafts drivingly connected with the screw shafts, and gearing interposed between said motor and said transverse drive shafts.

* * * * *